(12) United States Patent
Hu et al.

(10) Patent No.: US 7,631,091 B2
(45) Date of Patent: Dec. 8, 2009

(54) METHOD AND MECHANISM OF IMPROVING SYSTEM UTILIZATION AND THROUGHPUT

(75) Inventors: Wei Hu, Palo Alto, CA (US); Juan Loaiza, Redwood City, CA (US); Ramana Yerneni, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 787 days.

(21) Appl. No.: 11/060,897

(22) Filed: Feb. 18, 2005

(65) Prior Publication Data

US 2006/0190761 A1 Aug. 24, 2006

(51) Int. Cl.
*G06F 15/16* (2006.01)
*G06F 12/00* (2006.01)

(52) U.S. Cl. ..................... 709/229; 709/226

(58) Field of Classification Search ............... 709/229, 709/226, 203, 217, 218, 250
See application file for complete search history.

(56) References Cited

U.S. PATENT DOCUMENTS 6,480,893 B2 * 11/2002 Kriegsman .................. 709/226

OTHER PUBLICATIONS

Oracle Internet Directory. Administrator's Guide, Release 2.1.1, Part No. A86101-01, Sep. 2000. Part 1 of 6, pp. 1-108.
Oracle Internet Directory. Administrator's Guide, Release 2.1.1, Part No. A86101-01, Sep. 2000. Part 2 of 6, pp. 109-189.
Oracle Internet Directory. Administrator's Guide, Release 2.1.1, Part No. A86101-01, Sep. 2000. Part 3 of 6, pp. 190-297.
Oracle Internet Directory. Administrator's Guide, Release 2.1.1, Part No. A86101-01, Sep. 2000. Part 4 of 6, pp. 298-378.
Oracle Internet Directory. Administrator's Guide, Release 2.1.1, Part No. A86101-01, Sep. 2000. Part 5 of 6, pp. 379-459.
Oracle Internet Directory. Administrator's Guide, Release 2.1.1, Part No. A86101-01, Sep. 2000. Part 6 of 6, pp. 460-506.
Oracle Internet Directory. Application Developer's Guide, 10g (9.0. 4), Part No. B10461-01, Sep. 2003. Part 1 of 6, pp. 1-108.
Oracle Internet Directory. Application Developer's Guide, 10g (9.0. 4), Part No. B10461-01, Sep. 2003. Part 2 of 6, pp. 109-189.
Oracle Internet Directory. Application Developer's Guide, 10g (9.0. 4), Part No. B10461-01, Sep. 2003. Part 3 of 6, pp. 190-270.
Oracle Internet Directory. Application Developer's Guide, 10g (9.0. 4), Part No. B10461-01, Sep. 2003. Part 4 of 6, pp. 271-351.

(Continued)

*Primary Examiner*—Zarni Maung
(74) *Attorney, Agent, or Firm*—Vista IP Law Group, LLP.

(57) ABSTRACT

Disclosed are methods, systems, and mediums for improving system utilization and throughput. In some embodiments, application requests received at a primary site are routed to a secondary site for processing when the requests are found to be suitable for processing at the secondary site.

30 Claims, 7 Drawing Sheets

OTHER PUBLICATIONS

Oracle Internet Directory. Application Developer's Guide, 10g (9.0.4), Part No. B10461-01, Sep. 2003. Part 5 of 6, pp. 352-432.

Oracle Internet Directory. Application Developer's Guide, 10g (9.0.4), Part No. B10461-01, Sep. 2003. Part 6 of 6, pp. 433-546.

Oracle Database. Quick Installation Guide, 10g Release 1 (10.1.0.2.0) for 64-bit Windows, Part No. B13803-01, Apr. 2004.

Oracle Internet Directory. Application Developer's Guide, Release 9.0.2, Part No. A95193-01, Jan. 2002. Part 1 of 6, pp. 1-81.

Oracle Internet Directory. Application Developer's Guide, Release 9.0.2, Part No. A95193-01, Jan. 2002. Part 2 of 6, pp. 82-162.

Oracle Internet Directory. Application Developer's Guide, Release 9.0.2, Part No. A95193-01, Jan. 2002. Part 3 of 6, pp. 163-243.

Oracle Internet Directory. Application Developer's Guide, Release 9.0.2, Part No. A95193-01, Jan. 2002. Part 4 of 6, pp. 244-324.

Oracle Internet Directory. Application Developer's Guide, Release 9.0.2, Part No. A95193-01, Jan. 2002. Part 5 of 6, pp. 325-405.

Oracle Internet Directory. Application Developer's Guide, Release 9.0.2, Part No. A95193-01, Jan. 2002. Part 6 of 6, pp. 406-474.

Oracle Internet Directory: An Oracle White Paper, Nov. 2001.

* cited by examiner

METHOD AND MECHANISM OF IMPROVING SYSTEM UTILIZATION AND THROUGHPUT

BACKGROUND AND SUMMARY

The present invention is related to computer systems. More particularly, the present invention is directed to a method and mechanism of improving system utilization and throughput.

Many systems maintain backup, standby, remote, reporting, and/or replica copies of data at various sites throughout the network. This is done for high availability, as well as for creating copies of production data against which to run reporting applications. These copies may be maintained by the storage system, file system, database management system, and other software or hardware.

For explanatory purposes only and not as an intent to limit the scope of the invention, the term "primary data" will be used throughout this document to refer to production data, the term "primary site" will be used throughout this document to refer to any site comprising primary data, the term "secondary copy" will be used throughout this document to refer to any backup, standby, remote, reporting, or replica copy of primary data, and the term "secondary site" will be used throughout this document to refer to any site comprising one or more secondary copies of primary data.

Each piece of data (e.g., a file, a table, a partition, etc.) may be divided and stored separately. For instance, a secondary copy may be split into multiple pieces and saved on different sites throughout a network. Additionally, a system may keep several copies of a piece of data. For example, some database systems have more than one copy of a primary database to guard against multiple outages. The frequency in which a secondary copy is refreshed to reflect updates to the primary data may vary from system to system and even from one piece of data to another.

One drawback of maintaining secondary copies of data is the increased storage costs from having to purchase additional hardware. Since this additional hardware usually remains idle until a failure occurs, system utilization and throughput may be improved if some of the workload on the primary site could be offloaded onto one or more secondary sites. In most environments, secondary copies can only be opened in read-only mode when they are in the backup role. This prevents data divergence, which can occur when data at a secondary site is modified and those changes are not propagated to data at the primary site and are in conflict with updates made at the primary site. As a result, the secondary copy is no longer a faithful duplicate of the primary data.

However, because few applications are completely read-only, most applications will have to be re-written (or modified) in order to take advantage of secondary copies of data. This, in turn, reduces the usefulness of such data. Accordingly, there is a need for a method and mechanism that allow existing applications, which read and write, to utilize standby sites without having to be modified.

Embodiments of the present invention provide methods, systems, and media for improving system utilization and throughput. According to an embodiment, a request from an application to access data at a primary site is received. The request is evaluated to determine whether it is suitable for processing at a secondary site, which has a copy of the data at the primary site. If the request is found to be suitable for processing at the secondary site, the request is routed to the secondary site for processing.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Improvement of system utilization and throughput is disclosed. Rather than permit secondary sites to remain idle while primary sites are operative, or alter applications that are not purely read-only to allow them to utilize these sites, individual application requests are routed to a secondary site for processing when they are found to be suitable for remote processing. This ensures that secondary sites can do useful work even when an unmodified application, e.g., one that does a mix of reads and writes, is running. As a result, system utilization and throughput is increased as spare hardware, which would otherwise be inactive, can now be used without having to re-write existing applications.

Figure 1:
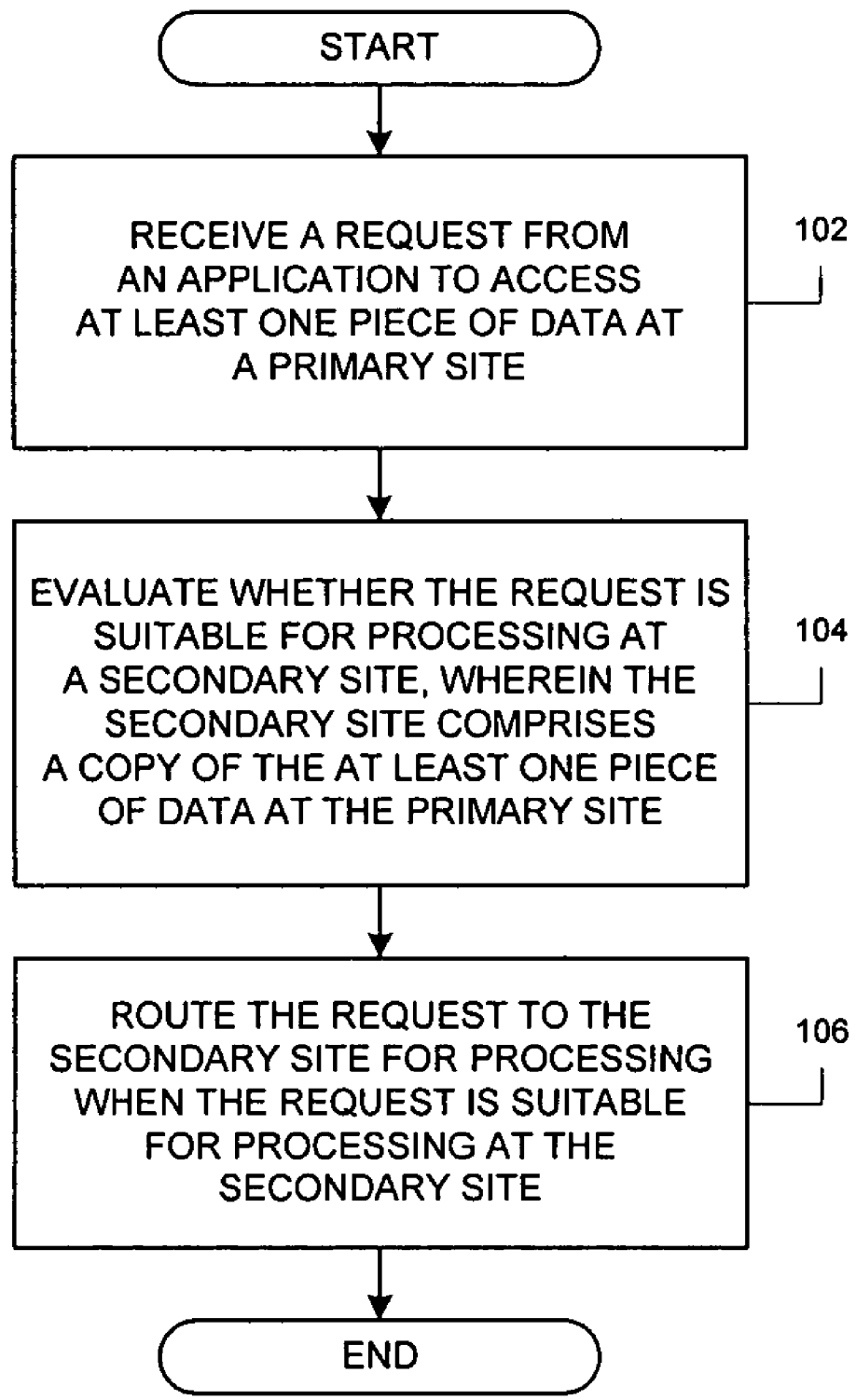
FIG. 1 is a flow chart of a method of improving system utilization and throughput according to an embodiment of the invention.

A process flow of a method of improving system utilization and throughput is illustrated in FIG. 1. Initially, a request from an application to access at least one piece of data at a primary site is received (102). The piece of data may be a file, filesystem, directory, device, storage unit, database, tablespace, partition, table, or row in a table. Additionally, it may be stored in main memory, hard drives, or some other medium.

The request is then evaluated to determine whether it is suitable for processing at a secondary site (104). This evaluation may be conducted dynamically. In the embodiment, the secondary site comprise a copy of the at least one piece of data at the primary site. A copy may be created and maintained in many ways. For example, a database can be replicated through mirror splits or log shipping. When the request is determined to be suitable for processing at the secondary site, the request is routed to the secondary site for processing (106).

Figure 2:
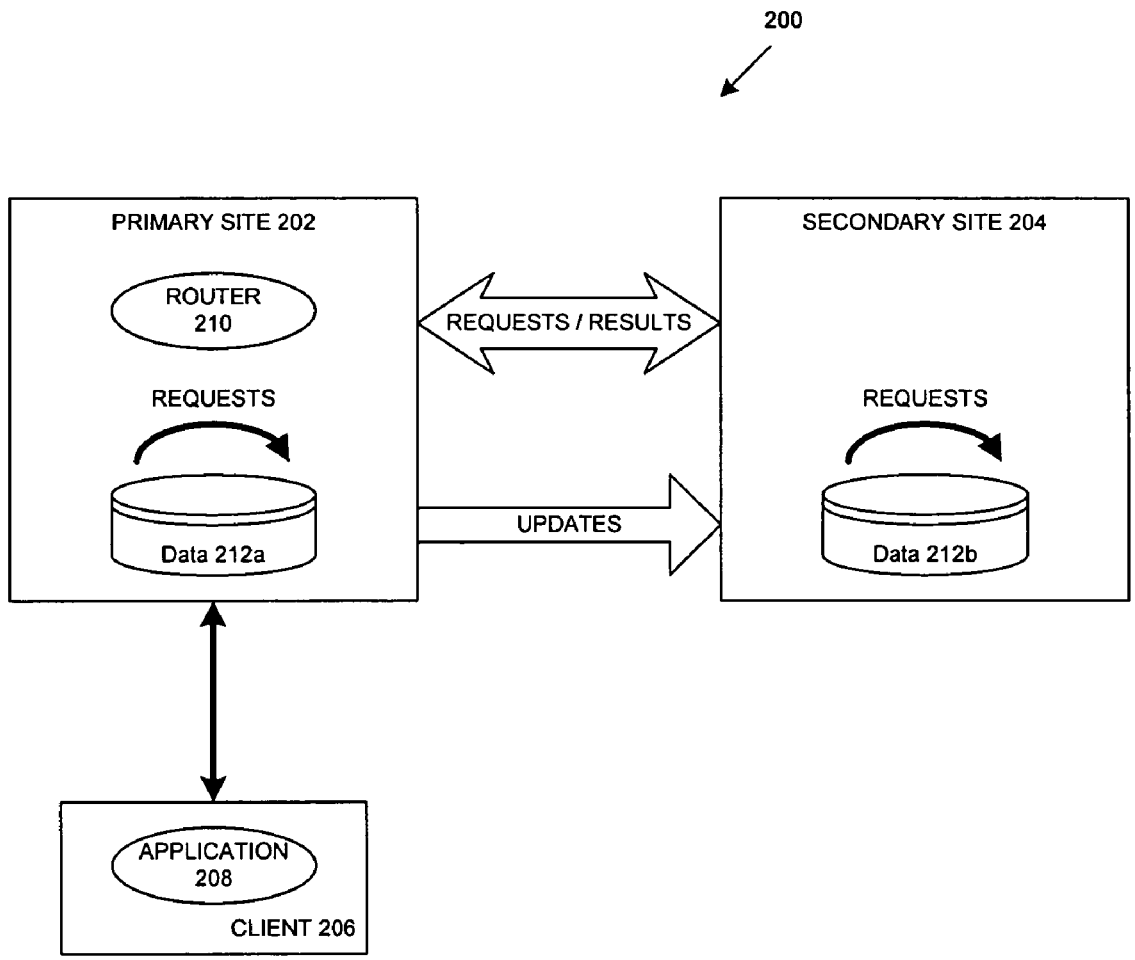
FIG. 2 illustrates an example of how a secondary site can be utilized to process requests received at a primary site according to one embodiment of the invention.

Depicted in FIG. 2 is a system 200 with a primary site 202, a secondary site 204, and a client 206. Primary site 202 comprises a data 212a, which has been duplicated at secondary site 204 as data 212b. Updates to data 212a are periodically transmitted from primary site 202 to secondary site 204. The frequency in which these updates are sent may be set by a system administrator. For databases, updates may be sent in the form of redo logs, which are then processed to refresh standby or backup databases.

As shown in the example, an application 208, running on client 206, is submitting requests to primary site 202. A router component 210 at primary site 202 intercepts the requests, evaluates them, and routes those requests that are suitable for remote processing to secondary site 204.

Whether a request is suitable for processing at a remote site may depend upon various parameters, such as the type of request, the user, the expected result, the execution context, the amount of local and network resources required, the workload on the primary and/or remote sites, the staleness of data, the cost and benefit of processing the request at the remote site, whether the request can be safely processed at the remote site, etc. In addition, these parameters may be adjusted based upon the request, application, client, site, data, or timing.

After a request has been diverted to secondary site 204, primary site 202 obtains a result from secondary site 204 and returns the result to application 208 at client 206. Thus, a high degree of application transparency can be offered as application 208 may not even be aware of secondary site 204 and instead works with a simple single-site view of system 200.

In other embodiments, a system may have multiple clients, primary sites, and/or secondary sites. And although in the embodiment of FIG. 2, secondary site 204 is only a backup or standby for primary site 202, in another embodiment, secondary site 204 may be a reporting site, created primarily to handle requests from reporting applications.

Figure 3:
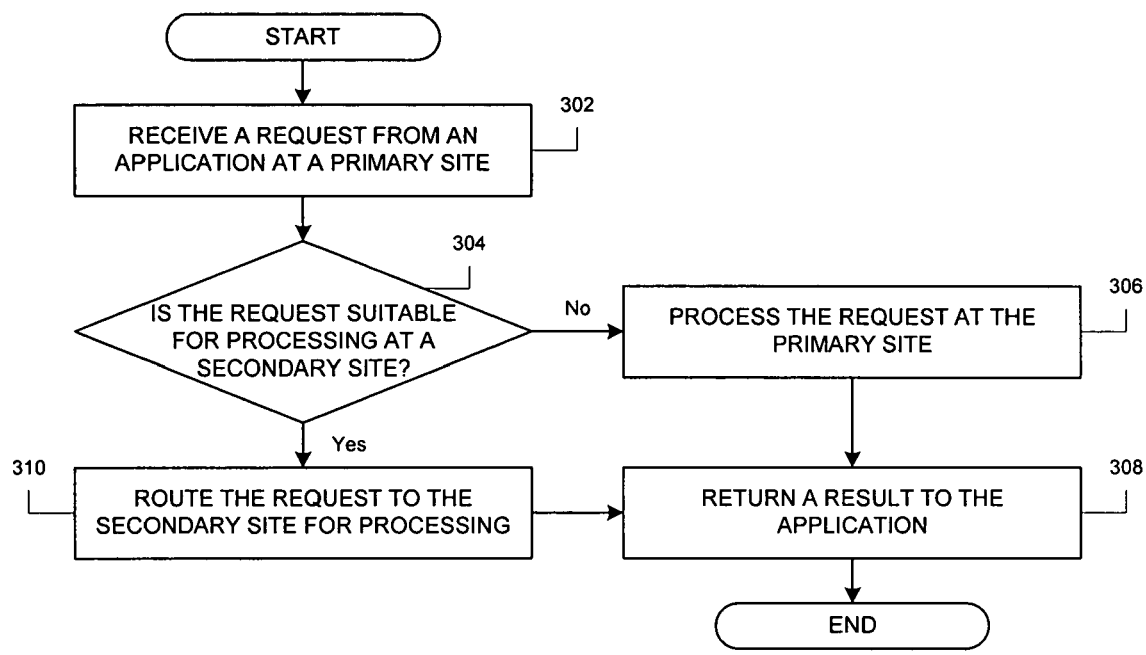
FIGS. 3-5 depict various embodiments of a method for improving system utilization and throughput.
Figure 4:
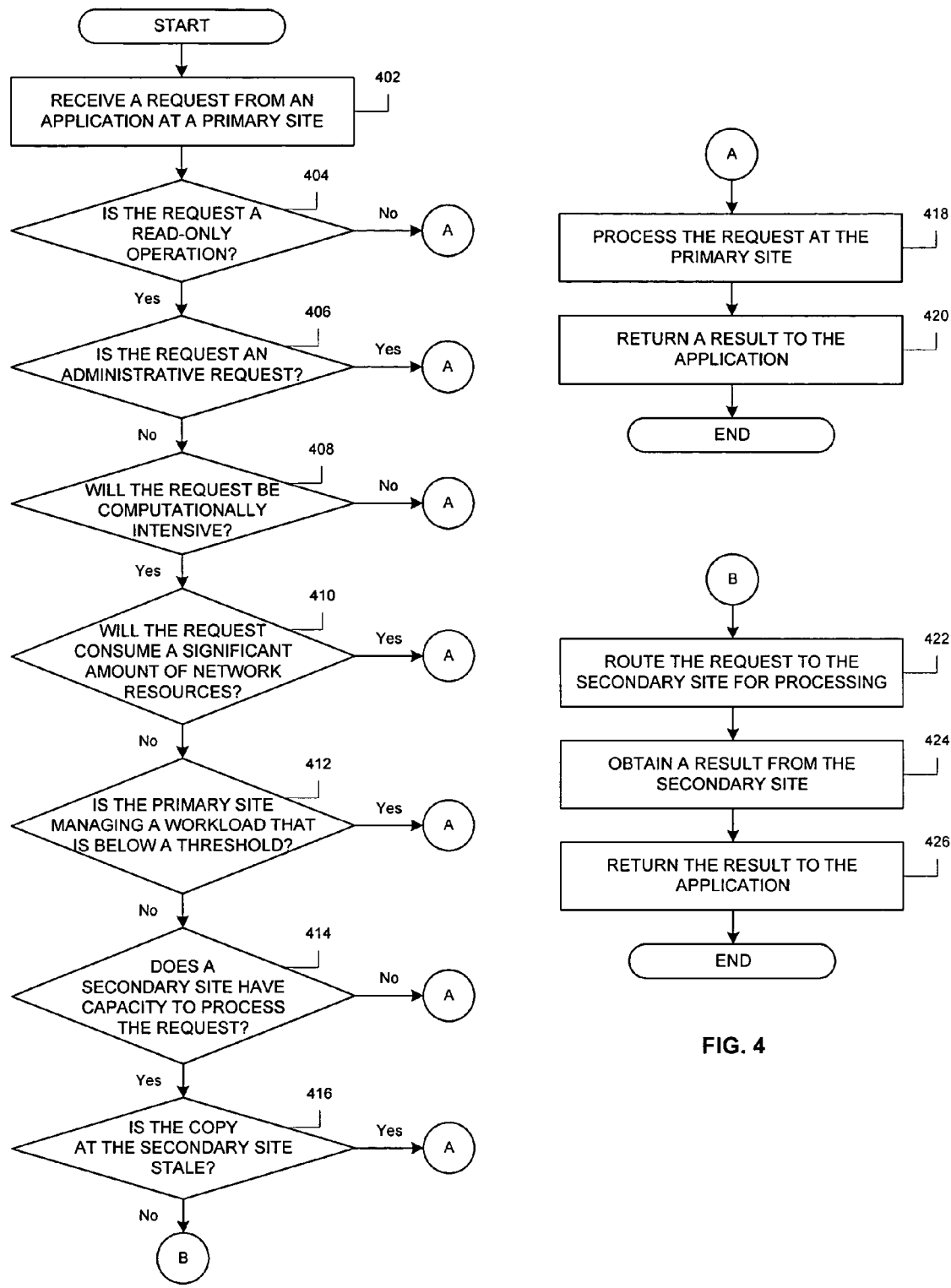

Process flows of other methods for improving system utilization and throughput are shown in FIGS. 3-4. In FIG. 3, a request from an application is received at a primary site (302). A determination is made at 304 as to whether the request is suitable for processing at a secondary site. If the request is not suitable for processing at the secondary site or if it cannot be determined whether the request is suitable or not, the request is processed at the primary site (306) and a result is returned to the application (308).

On the other hand, if the request is suitable for processing at the secondary site, the request is routed to the secondary site for processing (310) and a result is returned to the application (308). Hence, in this embodiment, the secondary site returns the result directly to the application rather than going through the primary site. The secondary site may adapt the result to make it appear as if it came from the primary site in order to maintain application transparency.

In FIG. 4, an application request is received at a primary site (402). The application request relates to data at the primary site, which has been replicated at a secondary site. At 404, a decision is made as to whether the request is a read-only operation. Since data at the secondary site is not allowed to be modified by requests in order to prevent data divergence, non-read-only operations, such as inserts, updates, and triggers, should not be processed at the secondary site. Therefore, when the request is not safe for processing at the secondary site, e.g., it is not a read-only operation or it cannot be determined if the request is a read-only operation, the request is processed at the primary site (418) and a result is returned to the application (420).

Even if the request is a read-only operation, the secondary site may not be an appropriate place to process the request. For instance, administrative requests should not be routed to the secondary site because they are meant to be performed on the primary site. Accordingly, at 406, a decision is made as to whether the request is an administrative request, i.e., a request from someone under an administrative role (e.g., a superuser on Unix). If it did, the request is not routed to the secondary site and is instead processed at the primary site (418).

Although based upon certain factors it may make sense to process the request at the secondary site, there are still other considerations that should be taken into account when deciding whether to forward a request to the secondary site. For example, at 408, a determination is made as to whether the request will be computationally intensive. If a request is not computationally intensive and therefore will not consume a lot of local resources (e.g., CPU and I/O bandwidth), sending the request to the secondary site for processing may be more costly than processing the request at the primary site because of the extra network hop required. Consequently, in the embodiment of FIG. 4, when the request will not require a lot of processing power, it is executed locally on the primary site (418).

Besides assessing whether the request will be computationally intensive, it is also helpful to analyze whether the request will consume a significant amount of network resources (410). For instance, requests that have large execution contexts (e.g., local language, session bindings, global variables, etc.) should not be sent for remote processing given the cost of transmitting the request along with its execution context to the secondary site. Additionally, requests that have huge outputs, results, or return values should probably be processed at the primary site in light of the potential delay in obtaining the results from the secondary site and forwarding them to the application. Thus, the request is processed at the primary site (418) when the request is likely to consume a significant amount of network resources.

Load balancing and availability considerations also need to be taken into account when making the decision to route a request to a secondary site. For instance, if the secondary site is not accessible, the request has to be processed at the primary site, even though it is a good candidate for diversion to the secondary site with respect to other factors (like the ones described above). In addition, if every request that satisfies the parameters discussed above is sent to a remote site, the system may unwittingly offload too much of the workload at the primary site and overload the secondary site.

Accordingly, at 412 a decision is made as to whether the primary site is managing a workload that is below a threshold. The threshold need not be the maximum load the primary site can manage. For example, the system may want to reserve extra capacity on the primary site for possible bursts of traffic. Hence, the threshold can be adjusted dynamically based on the needs of the system. If the workload at the primary site is below the threshold, i.e., the primary site can handle more requests, it is more efficient to process the request at the primary site (418).

In cases where the workload at the primary site is above the threshold, i.e., the primary site is overloaded, the request may still have to wait to be processed at the primary site (418) if it is determined that the secondary site does not have capacity to process the request (414). Moreover, even if all of the parameters discussed above are satisfied, the request still may not be routed to the secondary site for processing.

There may also be a delay between when an update is made at a primary site and when that change is propagated to the secondary copies. Consequently, when certain requests of an application transaction are routed to the secondary site based solely on the decisions above, these requests may not see updates made by earlier requests in the same transaction. For instance, a user may run an application transaction to deposit money in a bank account and within the same transaction subsequently verify the updated account balance. If the account balance request is routed to a secondary site before the deposit request (processed at a primary site) has propagated to the secondary site, the account balance request may not see the deposit that was made just prior to it within the same transaction.

In order to guarantee that requests in a transaction see updates made by earlier requests in the transaction, requests that are routed to the secondary site can be restricted. For example, a system can disallow the routing of all requests in a transaction that are received after the transaction has performed an update. Alternatively, applications, transactions, and/or requests can specify the oldest data they will tolerate. Hence, any data that is older is considered to be stale. Users may change the requirements for data freshness dynamically in other embodiments.

A primary site may keep track of how much each secondary site lags (i.e., the relative staleness of data at the site). Decisions can then be made as to whether the copy of the data at the secondary site is stale (416). If the copy is stale, the request is processed at the primary site (418). On the other hand, if the copy is not stale, the request is routed to the secondary site for processing (422), a result is obtained from the secondary site (424) and returned to the application (426).

Figure 5:
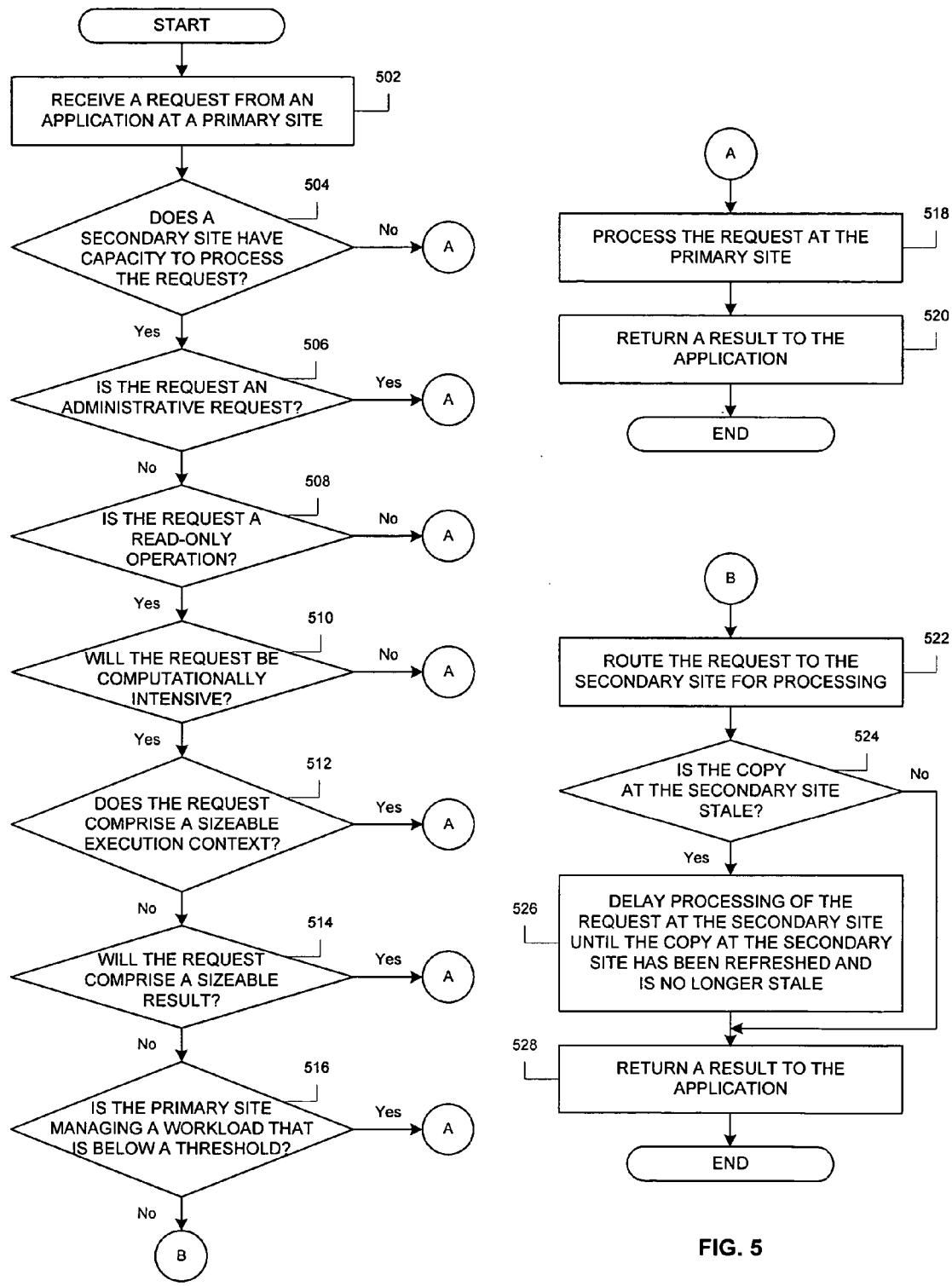

FIG. 5 illustrates a further embodiment of a method for improving system utilization and throughput. At 502, a request is received from an application at a primary site. The request concerns one or more pieces of data at the primary site, which have been duplicated on a secondary site. A consideration is made at 504 as to whether the secondary site has capacity to process the request. If the secondary site does not have capacity to process the request, the request is processed at the primary site (518) and a result is returned to the application (520). When the secondary site does have capacity to process the request, the request is verified as to whether it is an administrative request (506).

If the request is administrative, the process jumps to action 518. On the other hand, if the request is not administrative, the request is assessed as to whether it is a read-only operation (508). When the request is not a read-only operation or when it is not possible to decipher whether the request is or is not a read-only operation, the request is processed at the primary site (518) to guard against data divergence.

At 510, an estimation is made as to whether the request will be computationally intensive. If the request will not be computationally intensive, it is processed at the primary site (518). Conversely, if the request will be computationally intensive, a determination is made as to whether the request comprises a sizeable execution context (512).

The request is processed at the primary site (518) when the request comprises a sizeable execution context. When the request does not comprises a sizeable execution context, an approximation is made as to whether the request will comprise a sizeable result (514). If the request will comprise a sizeable result, the process skips to action 518. Otherwise, the primary site is examined to determine whether it is managing a workload that is below a threshold (516). The primary site processes the request (518) when its workload is below the threshold.

When the workload of the primary site is at or above the threshold, the request is routed to the secondary site for processing (522). A decision is then made as to whether the copy at the secondary site is stale (524). If the copy is not stale, the request is processed and a result is returned to the application (528).

On the other hand, if the copy is stale, processing of the request at the secondary site is delayed until the copy has been refreshed and is no longer stale (526). This can be accomplished by keeping track of the time at which data updates are made at a primary site and only processing requests at a secondary site when its copy of the data has been refreshed past that time. Maintenance and checking of acceptable staleness may be done at a file, filesystem, directory, device, storage unit, database, tablespace, partition, table, or row level. As a result, anomalies whereby transactions do not see the changes it made earlier are eliminated.

Figure 6:
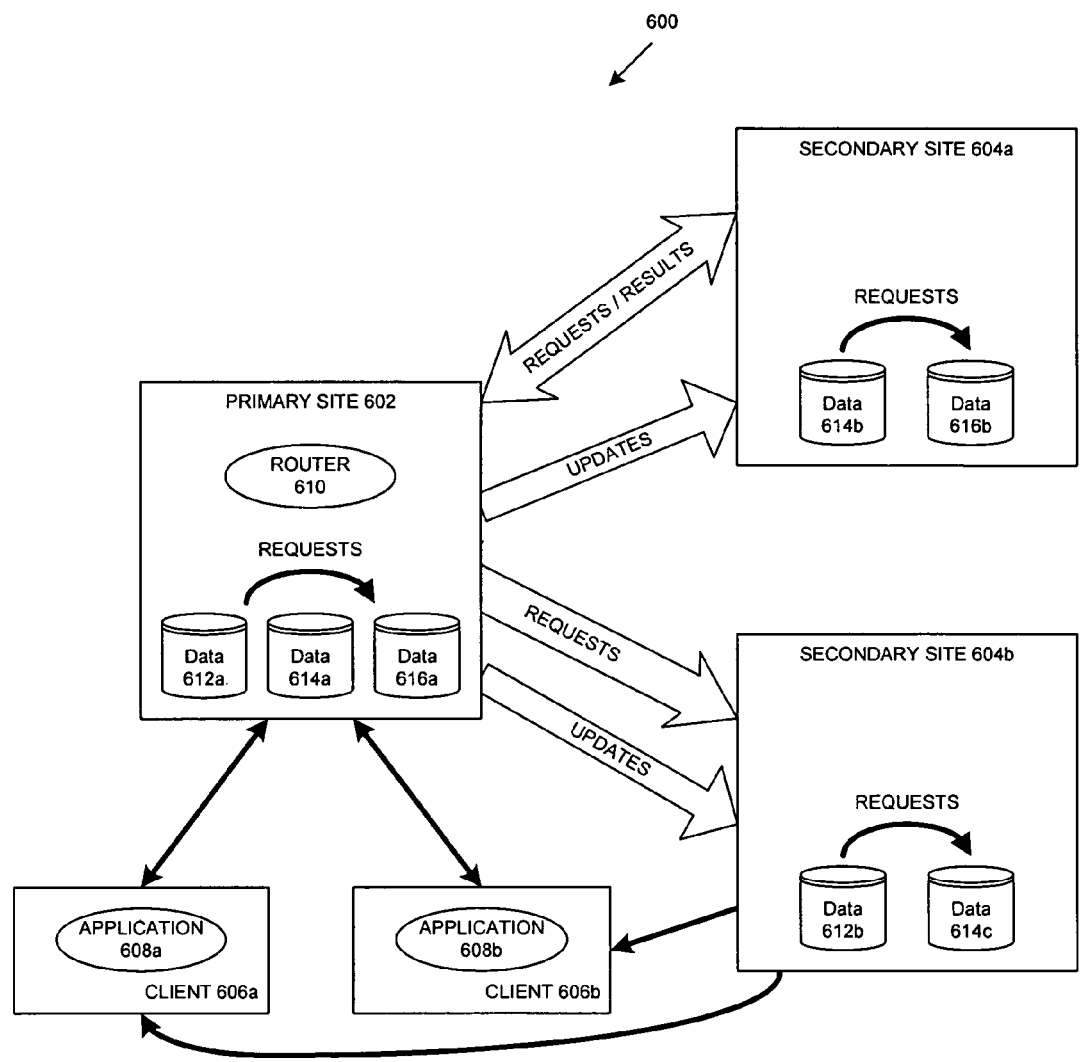
FIG. 6 shows an example of how application requests are processed in a system with multiple clients and secondary sites according to another embodiment of the invention.

FIG. 6 depicts a system 600 with a primary site 602, two secondary sites 604a and 604b, and two clients 606a and 606b. Primary site 602 includes a router 610 and three pieces of data 612a, 614a, and 616a. A copy of data 612a can be found at site 604b as data 612b. Data 614a has been replicated on both secondary sites 604a and 604b as data 614b and data 614c, respectively. A duplicate of data 616a can be found at secondary site 604a as data 616b. Updates are propagated from primary site 602 to secondary sites 604a and 604b periodically. In other embodiments, a copy of a piece of data may be split into multiple pieces and stored at different secondary sites. Additionally, not all pieces of data will have a secondary copy.

In the embodiment, applications 608a and 608b on clients 606a and 606b, respectively, are submitting requests to primary site 602. Router 610 will examine each request individually and make an independent routing decision based upon the location of the duplicated data, environmental considerations, as well as conditions specified by, for example, the respective application or client. When requests are routed to secondary site 604a, results are returned to primary site 602 for forwarding to the respective application. In contrast, secondary site 604b returns results directly to the respective applications 608a-608b on clients 606a-606b.

As discussed above, there are many factors that influence the decision of whether or not to route a request. In addition, suitability parameters may be changed or eliminated depending upon the semantic and performance criteria specified by an application, transaction, request, data, client, site, or system. For example, in some embodiments, a request that will not be computationally intensive may still be routed to a secondary site for processing when a primary site is overloaded and the secondary site has available capacity. Additionally, in embodiments where results are returned directly from a secondary site, requests may not be analyzed to determine whether they are likely to consume a significant amount of network resources. Furthermore, the order in which suitability factors are evaluated can be altered, as seen in FIGS. 4 and 5.

Ideally, information will be gathered not only about a request, but the application and/or transaction parameters associated with the request, as well as the user and system environments in which the request is being executed, since all relevant information should be factored into the decision process of whether to route the request. This allows decisions to be made in a safe and incremental manner, i.e., only requests that are deemed safe and beneficial to route are routed initially. As more information can be garnered about semantic and performance considerations, additional requests can be routed to achieve even higher system throughput.

System Architecture Overview

Figure 7:
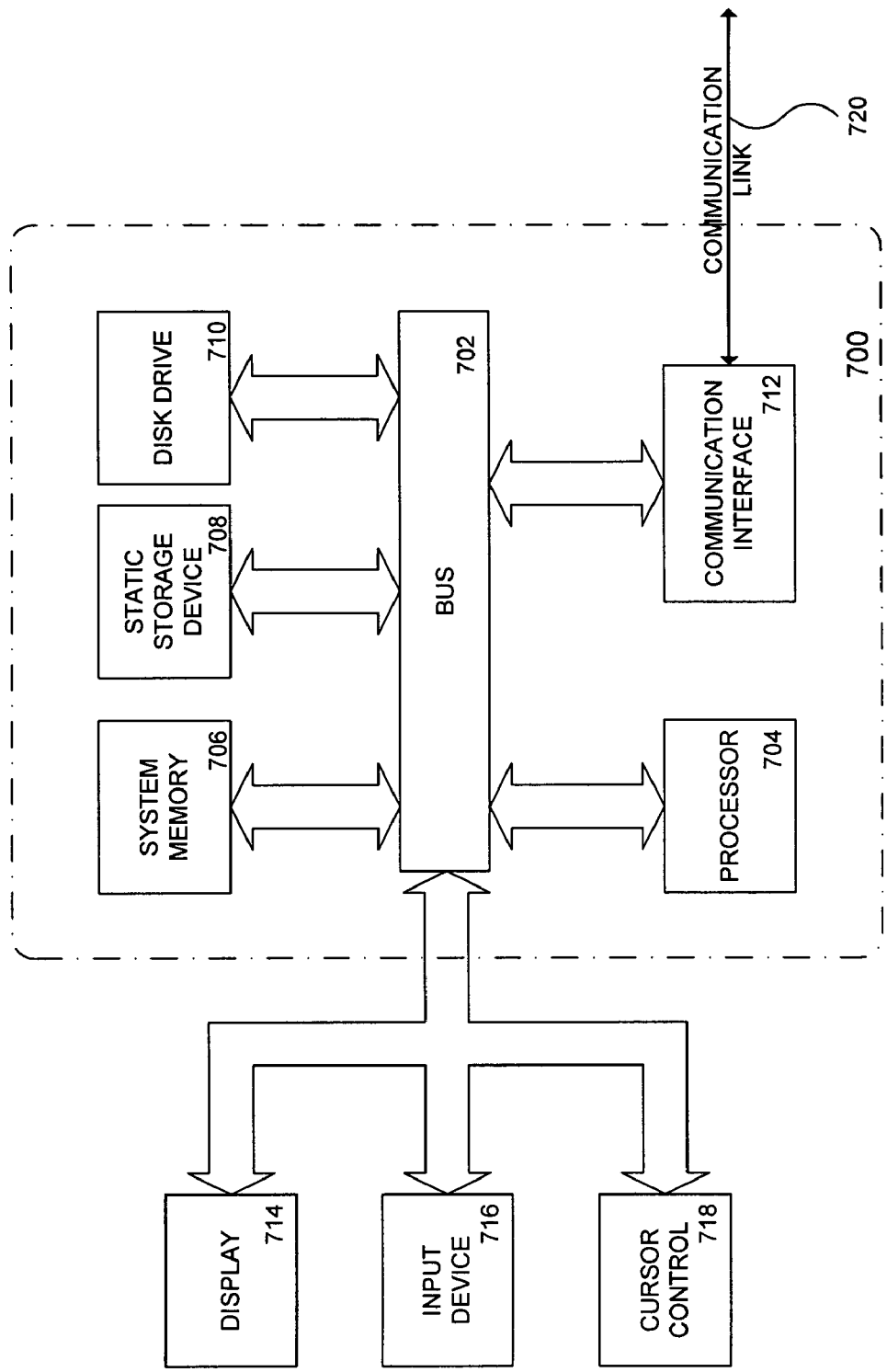
FIG. 7 is a diagram of a computer system with which embodiments of the present invention can be implemented.

FIG. 7 is a block diagram of a computer system 700 suitable for implementing an embodiment of the present invention. Computer system 700 includes a bus 702 or other communication mechanism for communicating information, which interconnects subsystems and devices, such as processor 704, system memory 706 (e.g., RAM), static storage device 708 (e.g., ROM), disk drive 710 (e.g., magnetic or optical), communication interface 712 (e.g., modem or ethernet card), display 714 (e.g., CRT or LCD), input device 716 (e.g., keyboard), and cursor control 718 (e.g., mouse or trackball).

According to one embodiment of the invention, computer system 700 performs specific operations by processor 704 executing one or more sequences of one or more instructions contained in system memory 706. Such instructions may be read into system memory 706 from another computer readable medium, such as static storage device 708 or disk drive 710. In alternative embodiments, hard-wired circuitry may be used in place of or in combination with software instructions to implement the invention.

The term "computer readable medium" as used herein refers to any medium that participates in providing instructions to processor 704 for execution. Such a medium may take many forms, including but not limited to, non-volatile and volatile media. Non-volatile media includes, for example, optical or magnetic disks, such as disk drive 710. Volatile media includes dynamic memory, such as system memory 706.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 700. According to other embodiments of the invention, two or more computer systems 700 coupled by communication link 720 (e.g., LAN, PTSN, or wireless network) may perform the sequence of instructions required to practice the invention in coordination with one another.

Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

In the foregoing specification, the invention has been described with reference to specific embodiments thereof. It will however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method of improving system utilization, the method comprising:
   receiving a request from an application to access at least one data item at a primary site;
   evaluating whether the request is suitable for processing at a secondary site to improve system utilization, wherein the secondary site comprises a copy of the at least one data item at the primary site;
   routing the request to the secondary site for processing when the request is suitable for processing at the secondary site, wherein the copy of the at least one data item at the secondary site is refreshed based at least in part on identifying a change made to the at least one data item at the primary site and is refreshed to reflect the change made to the at least one data item at the primary site; and
   displaying a result of the processing on a display apparatus or storing the result in a tangible computer readable medium or a storage device.

2. The method of claim 1, wherein evaluating whether the request is suitable for processing at the secondary site comprises:
   assessing whether the request is a read-only operation.

3. The method of claim 1, wherein evaluating whether the request is suitable for processing at the secondary site comprises:
   analyzing whether the request will consume a significant amount of network resources.

4. The method of claim 3, wherein ascertaining whether the request will consume a significant amount of network resources comprises:
   ascertaining whether the request comprises a sizeable execution context.

5. The method of claim 3, wherein ascertaining whether the request will consume a significant amount of network resources comprises:
   approximating whether the request will comprise a sizable result.

6. The method of claim 1, wherein evaluating whether the request is suitable for processing at the secondary site comprises:
   estimating whether the request will be computationally intensive.

7. The method of claim 1, wherein evaluating whether the request is suitable for processing at the secondary site comprises:
   considering whether the secondary site has capacity to process the request.

8. The method of claim 1, wherein evaluating whether the request is suitable for processing at the secondary site comprises:
   examining whether the primary site is managing a workload that is below a threshold.

9. The method of claim 8, wherein the threshold is adjustable.

10. The method of claim 1, wherein evaluating whether the request is suitable for processing at the secondary site comprises:
    verifying whether the request is an administrative request.

11. The method of claim 1, wherein evaluating whether the request is suitable for processing at the secondary site comprises:
    deciding whether the copy at the secondary site is stale.

12. The method of claim 11, wherein staleness depends upon the request or the application.

13. The method of claim 11, wherein staleness is decided at a file, filesystem, directory, device, storage unit, database, tablespace, partition, table, or row level.

14. The method of claim 1, further comprising:
    determining whether the copy at the secondary site is stale; and
    delaying processing of the request at the secondary site until the copy at the secondary site has been refreshed and is no longer stale.

15. The method of claim 1, further comprising:
    processing the request at the primary site when the request is not suitable for processing at the secondary site.

16. The method of claim 1, further comprising:
    obtaining a result from the secondary site.

17. The method of claim 1, further comprising:
    returning a result to the application.

18. The method of claim 1, wherein the secondary site is transparent to the application.

19. The method of claim 1, wherein suitability of the request can be adjusted by adjusting one or more parameters.

20. The method of claim 1, wherein the request is evaluated dynamically.

21. The method of claim 1, wherein the at least one data item is a file, filesystem, directory, device, storage unit, database, tablespace, partition, table, or row in a table.

22. A computer program product that includes a computer readable storage medium, the computer readable storage medium comprising instructions which, when executed by a processor, causes the processor to execute a process for improving system utilization, the process comprising:
   receiving a request from an application to access at least one data item at a primary site;
   evaluating whether the request is suitable for processing at a secondary site to improve system utilization, wherein the secondary site comprises a copy of the at least one data item at the primary site; and
   routing the request to the secondary site for processing when the request is suitable for processing at the secondary site, wherein the copy of the at least one data item at the secondary site is refreshed based at least in part on identifying a change made to the at least one data item at the primary site and is refreshed to reflect the change made to the at least one data item at the primary site.

23. The computer program product of claim 22, wherein evaluating whether the request is suitable for processing at the secondary site comprises:
   assessing whether the request is a read-only operation;
   estimating whether the request will be computationally intensive;
   deciding whether the copy at the secondary site is stale; and
   considering whether the secondary site has capacity to process the request.

24. A system for improving system utilization, the system comprising:
   means for receiving a request from an application to access at least one data item at a primary site;
   means for evaluating whether the request is suitable for processing at a secondary site to improve system utilization, wherein the secondary site comprises a copy of the at least one data item at the primary site, and the means for evaluating whether the request is suitable for processing at a secondary site comprises a processor; and
   means for routing the request to the secondary site for processing when the request is suitable for processing at the secondary site, wherein the copy of the at least one data item at the secondary site is refreshed based at least in part on identifying a change made to the at least one data item at the primary site and is refreshed to reflect the change made to the at least one data item at the primary site.

25. The system of claim 24, wherein means for evaluating whether the request is suitable for processing at the secondary site comprises:
   means for assessing whether the request is a read-only operation;
   means for estimating whether the request will be computationally intensive;
   means for deciding whether the copy at the secondary site is stale; and
   means for considering whether the secondary site has capacity to process the request.

26. The system of claim 24, wherein the system is a database system.

27. A filesystem comprising instructions which, when executed by a processor, causes the processor to execute a process for improving system utilization, the process comprising:
   receiving a request from an application to access at least one data item at a primary site;
   evaluating whether the request is suitable for processing at a secondary site to improve system utilization, wherein the secondary site comprises a copy of the at least one data item at the primary site;
   routing the request to the secondary site for processing when the request is suitable for processing at the secondary site, wherein the copy of the at least one data item at the secondary site is refreshed based at least in part on identifying a change made to the at least one date item at the primary site and is refreshed to reflect the change made to the at least one date item at the primary site; and
   displaying a result of an act of routing the request to the secondary site or storing the result in a tangible computer readable medium.

28. The filesystem of claim 27, wherein evaluating whether the request is suitable for processing at the secondary site comprises:
   assessing whether the request is a read-only operation;
   estimating whether the request will be computationally intensive;
   deciding whether the copy at the secondary site is stale; and
   considering whether the secondary site has capacity to process the request.

29. A storage unit comprising instructions which, when executed by a processor, causes the processor to execute a process for improving system utilization, the process comprising:
   receiving a request from an application to access at least one data item at a primary site;
   evaluating whether the request is suitable for processing at a secondary site to improve system utilization, wherein the secondary site comprises a copy of the at least one data item at the primary site; and
   routing the request to the secondary site for processing when the request is suitable for processing at the secondary site, wherein the copy of the at least one data item at the secondary site is refreshed based at least in part on identifying a change made to the at least one data item at the primary site and is refreshed to reflect the change made to the at least one data item at the primary site.

30. The storage unit of claim 29, wherein evaluating whether the request is suitable for processing at the secondary site comprises:
   assessing whether the request is a read-only operation;
   estimating whether the request will be computationally intensive;
   deciding whether the copy at the secondary site is stale; and
   considering whether the secondary site has capacity to process the request.

* * * * *

UNITED STATES PATENT AND TRADEMARK OFFICE
CERTIFICATE OF CORRECTION

PATENT NO. : 7,631,091 B2  Page 1 of 1
APPLICATION NO. : 11/060897
DATED : December 8, 2009
INVENTOR(S) : Wei Hu et al.

It is certified that error appears in the above-identified patent and that said Letters Patent is hereby corrected as shown below:

In column 7, line 44, delete "will" and insert -- will, --, therefor.

In column 10, line 21, in claim 27, delete "date" and insert -- data --, therefor.

In column 10, line 23, in claim 27, delete "date" and insert -- data --, therefor.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,631,091 B2  Page 1 of 1
APPLICATION NO. : 11/060897
DATED : December 8, 2009
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Second Day of November, 2010

David J. Kappos
*Director of the United States Patent and Trademark Office*